Figure 1:
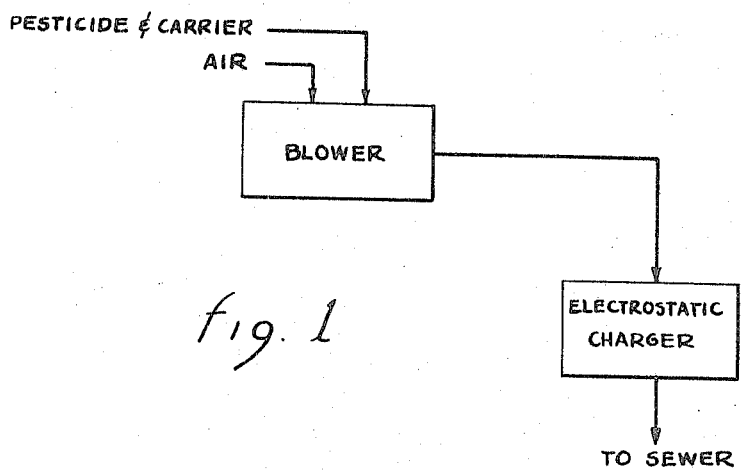

May 30, 1967 P. P. DOAKLEY 3,322,623
METHOD OF INHIBITING ROACH INFESTATION IN WASTE
DISPOSAL SYSTEMS WITH ELECTROSTATIC
BENTONITE-PESTICIDE COMPOSITION
Filed Nov. 12, 1964

INVENTOR.
PETER P. DOAKLEY
BY McLaughlin, Cahill & Drummond
ATTORNEYS

United States Patent Office 3,322,623
Patented May 30, 1967

3,322,623
METHOD OF INHIBITING ROACH INFESTATION IN WASTE DISPOSAL SYSTEMS WITH ELECTROSTATIC BENTONITE-PESTICIDE COMPOSITION
Peter P. Doakley, 500 W. Georgia Ave., Phoenix, Ariz. 85013
Filed Nov. 12, 1964, Ser. No. 410,370
4 Claims. (Cl. 167—39)

My invention relates to a method and composition for controlling pests, and more particularly to a method and composition useful for controlling forage pests when such pests are located in substantially closed or confined spaces.

Many forage pests, particularly those of the household varieties, generally tend to breed or reside in places which are difficult to reach by ordinary methods. For instance, sewers, manholes, drainage pipes, and the like are particularly susceptible to pest infestation. Heretofore it has been not only difficult but virtually impossible to control pests in relatively confined locations such as these, portions of which may be hundreds of feet from any useful point of access. Forage pests thrive in locations which are not only confined, but which contain or transmit sewage, waste food or other nutrient material on which they generally feed. In most cases, the nutrient material is introduced to the confined space or transported therein by means of water, with the nutrient material in aqueous slurry or solution. Control of pests has been difficult because of the virtual inaccessibility of such locations to the application of pesticides. Also, because of the water usually present, pesticides may be washed away, diluted or otherwise rendered ineffective after a short period of time.

A particularly troublesome pest found in many parts of the United States is the cockroach. Roaches thrive in such places as sewer manholes, sewers, sewer laterals, and various plumbing and the like in the ordinary household, or other locations where sewage or garbage is likely to be found in relatively confined spaces. If all the plumbing in the sewage system from the sink in the kitchen to the main sewage line were completely full of water or at least of aqueous slurry at all times, roaches would be of little concern, but this is not generally the case. Most sewer systems carry only a minor proportion of their full capacity at any given time. Roaches generally reside in the substantially dry area above the water line in the usual household-city sewer system. Pesticides introduced directly to the sewage are ordinarily ineffective, since they are washed away almost as quickly as they are applied. Desirably, a pesticide would be applied to the relatively dry area above the sewage-water line in the system. Up to the present time, no satisfactory method has been suggested which would permit such introduction in effective amounts. Furthermore, when previously known methods have been tried, residence time of the pesticide has been very short, infestation reoccurring in a few days or at best in a few weeks.

I have discovered a new method whereby a pesticide may be introduced to a sewage system thereby effectively rendering that system free of forage pests, particularly roaches, for periods as long as up to six months or more. In accordance with my invention, inhibition of pest infestation in relatively confined locations is accomplished by introducing a selected pesticide and an electrostatically charged carrier therefor in the form of a lyophobic colloid with air to the area to be treated.

Figure 2:
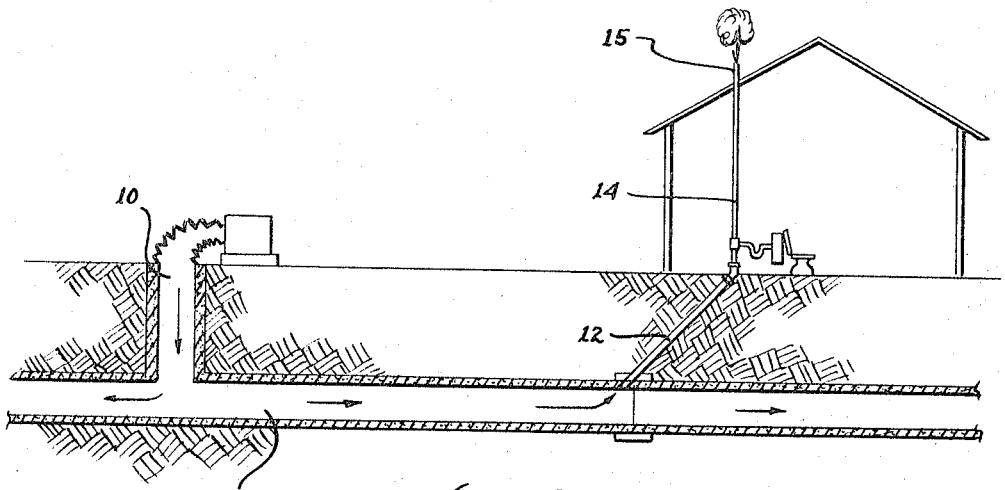

A non-limiting embodiment of my invention is set forth in the accompanying drawings in which:

FIG. 1 is a schematic representation of a means of introducing pesticide to a confined space; and FIG. 2 is a schematic representation of a household-city sewage system being treated in accordance with my invention.

In the embodiment shown in the drawings, an electrostatically chargeable carrier, mixed with a pesticide, and air are introduced to a blower. The resulting mixture is introduced to an electrostatic charger which imparts an electrostatic charge to the pesticide carrier. Because of the electrostatic charge imparted to the carrier, the carrier particles become mutually repelling, thereby forming a lyophobic extrinsic colloidal aerosol comprising a gaseous continuous phase (air) and a disperse phase comprising electrostatically charged carrier particles having pesticide absorbed or otherwise contained thereon. Aerosol from the blower and electrostatic charger is introduced to the top of a manhole 10, generally in the street or alley of a city. Aerosol travels downwardly in the manhole 10 and reaches the main sewer line 11. Aerosol travels in the sewer line 11 until it reaches a household lateral 12. Aerosol enters the lateral 12 and is forced up the lateral 12 to the household system 14. Ordinarily, treatment is continued until a small puff of aerosol exits the household standpipes 15 thereby indicating that aerosol has been introduced to the entire system.

Usually, the treatment is sufficient to affect houses, etc., having laterals 12 joining the main sewer line 11 between the manhole into which the aerosol is introduced and the next succeeding manholes in the main sewer line. For clarity, only one such lateral is shown. The range of treatment may be increased, of course, by increasing both the rate at which aerosol is blown into the manhole and the length of treatment, but this is a matter of choice for the operator. Ordinarily, good practice would dictate treating an area just sufficient to be reached from the manhole being blown without overlapping on comparable areas reachable from next succeeding or other more distant manholes.

Unexpectedly, pesticide is carried by the electrostatically charged dust which acts as a sticker and adheres to the exposed surfaces of the system and interstices associated therewith. Apparently, the electric charge on the carrier dust operates to make the dust-pesticide mixture adhere. This is a seeming anomaly since it is also apparently the electric charge on the dust particles which maintains the stability of the colloidal suspension in the aerosol introduced to the manhole. Pesticide does, however, stick to the surfaces and interstices of the system and retentivity of the active pesticide is excellent. Carriers or dusts useful in the present invention are those which are chemically substantially inert and both of a size and composition capable of receiving and retaining an electrostatic charge thereby ot form lyophobic extrinsic colloidal aerosol with a gaseous continuous phase such as, for example, air. A particularly good dust for use in the present invention is finely-divided bentonite clay.

A wide variety of pesticides is useful in accordance with my invention. It must, however, be remembered that pesticides used in accordance with my invention come very close to contact with human beings and other useful warm-blooded animals. Accordingly, pesticides for use in my invention must have the properties of killing the undesirable pests while at the same time being relatively safe for use in close proximity with human habitation. One of the indices used to determine suitability of pesticides for use in the presence of human life is the acute oral toxicity number. Usually, acute oral toxicity is designated by what is called an LD number. This is usually written $LD_{50}$. As used herein, the term LD means "lethal dose" and the subscript 50 means that the designated amount of pesticide was a lethal dose of 50% of the cases teste, thus $LD_{50}$. The number following the $LD_{50}$ designation is the weight in milligrams of the pesticide per kilogram of body weight of the test animal (usually rats) which was a lethal dose 50% of the time. For perspective, DDT has an acute oral $LD_{50}$ number of 250. This means that in 50% of the test cases, 250 milligrams of DDT per kilogram of test animal body weight was fatal. For use in accordance with the present invention, I prefer a pesticide which has an acute oral $LD_{50}$ number of at least 400, and preferably 500 or more.

Pesticides for my invention are preferably of the contact type. The pesticide is not ordinarily in the food of the pests, but is disposed in the areas in which the pests reside, breed and habitate generally. Thus, ingestion of the pesticide is fairly unlikely and contact pesticides are preferred.

For further safety in use with or near human habitation, I also prefer a pesticide having a single skin penetration $LD_{50}$ number greater than about 3,000. The single skin penetration test refers to the penetration and toxicity with mammalian skin. The single skin penetration $LD_{50}$ number means substantially the same as the acute oral $LD_{50}$ number, i.e. the number is milligrams of pesticide per kilogram of test animal body weight required for a lethal dose in 50% of the test animals. Naturally, higher single skin penetration $LD_{50}$ numbers are desirable or even preferred for use in or about human habitation as long as the pesticide will maintain its activity toward the pests desired to be removed.

Typical non-limiting examples of pesticides useful in accordance with my invention are:

1-naphthyl-N-methyl carbamate ("Sevin")
1,1 - bis(chlorophenyl) - 2,2,2 - trichloroethanol ("Kelthane")
Diethyl-mercaptosuccinate-O,O - dimethyl - phosphorodithioate ("malathion")
2-(p-tert-butyl-phenoxy)isopropyl 2 - chloroethyl sulfite ("aramite")
2,4,5,4'-tetrachlorodiphenylsulfone ("tedion")

I have also discovered that 1-naphthyl N-methylcarbamate may be employed with great success in the killing of roaches in accordance with the present invention. 1-naphthyl N-methylcarbamate has an acute oral $LD_{50}$ number of 540, and a single skin penetration $LD_{50}$ number of greater than 5,000. The literature, however, indicates that 1-naphthyl N-methylcarbamate is of no particular use against roaches. It was, therefore, highly unexpected that 1-naphthyl N-methylcarbamate should have not only the desired high acute oral and single skin $LD_{50}$ numbers as well as high contact toxicity toward cockroaches. 1-naphthyl N-methylcarbamate is therefore the preferred pesticide to be used in accordance with my invention when the pest to be destroyed is the cockroach.

Dust-pesticide mixtures used in my invention will vary in composition depending on the requisite amount of pesticide and its individual characteristics. When one 1-naphthyl N-methylcarbamate is used for the control of cockroaches, mixtures containing from about 2 to about 20 weight per unit of active pesticide are useful. I ordinarily use from about 2 to about 10 percent by weight of active pesticide and prefer mixtures containing 5 percent of active ingredient. A higher percentage of pesticide may be employed for the particular conditions of application or infestation, as desired.

As used herein, the term "active dust" will mean the mixture of pesticide with electrostatically chargeable inert carrier and the term "aerosol" means a colloidal dispersion of electrically charged active dust in air as the continuous phase. In general, then, the active dust-air dispersions employed in accordance with the present invention may be termed lyophobic extrinsic colloidal aerosols.

My invention is not only useful in sewage systems, but may be employed anywhere where pests live, particularly where the pests are in relatively inaccessible confined or enclosed spaces. Aerosol in accordance with my invention may be introduced substantially as illustratively described herein or may be introduced by any other suitable method. When my method and composition are employed, particularly on roaches, good kills and excellent retentivity of pesticide are obtained. Further, the treated areas are substantially uniformly coated with pesticide, thus preventing small colonies or pockets of pest life from forming.

A better understanding of my invention may be obtained in light of the following example which is set forth to illustrate and is not to be construed to limit my invention.

*Example*

A manhole which contained considerable cockroach life was opened and a count of the cockroaches taken. By examination of a small area and appropriate extrapolation, it was determined that there were from about 1500 to 2000 roaches in the manhole. It may be legitimately assumed that comparable infestation in the related sewer line, sewer laterals and household plumbing systems was present.

Apparatus comprising a blower of the type sold by Gustafson Manufacturing Co., Inc., of Corpus Christi, Tex., under the designation Model "D" and capable of blowing 852 cubic feet per minute at 3100 r.p.m., and an electrostatic charger of the type sold by Agitronic Inc. of Bedford, Tex., as Electro-Static Dust Charger Model number 0756 was set up near the manhole. Bentonite dust having an average particle size of about 50 microns was mixed with particulate 1-naphthyl N-methylcarbamate to form an active dust. About 5 percent of the total active dust weight was active ingredient (1-naphthyl N - methylcarbamate). The manhole - lateral-household sewage system had manholes spaced about 300 feet apart with laterals about 150 feet in length. An aerosol was produced by blowing the active dust through the electrostatic charger. Aerosol, thus produced, was blown into the previously described manhole until small puffs of the aerosol could be seen coming from the standpipes in houses off the laterals. Calculations indicated that about 12 pounds of active dust were deposited per 50 square feet of surface area.

About 5 or 6 minutes after blowing was completed, the manhole was opened and examination made of the exposed surface area therein. Substantially all the cockroaches previously in the manhole were dead. A watch was kept on the sewage stream through the manhole, to determine whether or not the kill upstream was effective. Within 10 to 12 minutes, the sewage stream was loaded with dead cockroaches. Substantially all the cockroaches in the area coated with aerosol were dead.

Re-examination of the manhole and laterals after three months indicated no cockroaches present therein. A second re-examination after 6 months indicated substantially the same excellent retentivity of pesticide on the surfaces of the sewage system and essentially complete inhibition of cockroach life thereby.

In the complete test, over 300 manholes in the city of Phoenix, Arizona, were blown in the same manner on the same day, with results in each manhole substantially as described.

Various modifications may be made in the present invention without departing from the spirit or scope thereof and it is to be understood that I limit myself only as defined in the appended claims.

I claim:

1. A method of inhibiting roach infestation in waste disposal systems comprising contacting interior surfaces and interstices of said systems with a lyophobic extrinsic colloidal aerosol comprising air as the continuous phase and a disperse phase of electrostatically charged particles of a composition comprising bentonite dust on which has been adsorbed 2–20% of a pesticide selected from the class consisting of 1-naphthyl-N-methyl carbamate,
1,1-bis(chlorophenyl)-2,2,2-trichloroethanol,
diethyl - mercaptosuccinate - O,O - dimethyl - phosphorodithioate,
2-(p-tert-butyl-phenoxy)isopropyl 2-chloroethyl sulfite, and
2,4,5,4'-tetrachlorodiphenylsulfone.

2. Method of claim 1 in which said pesticide is 1-naphthyl-N-methylcarbamate.

3. The method of treating a sewer system to free the same of roaches over a relatively long period of time which comprises passing air and a mixture of bentonite dust and 1-naphthyl-N-methylcarbamate containing 2–20% of said carbamate through an electrostatic charger under pressure to form an aerosol in which air is a continuous phase and said carbamate treated bentonite dust is a disperse phase, introducing said aerosol under pressure into said system to cause the aerosol to penetrate laterals from the system running to homes and soil pipes and vents connected to such laterals, whereby to deposit said dust on exposed surfaces of such system including said laterals and connections thereto.

4. Method of claim 3 in which said 1-naphthyl-N-methylcarbamate is present in an amount of about 5% of said mixture.

References Cited

UNITED STATES PATENTS

| | | | |
|---|---|---|---|
| 2,191,421 | 2/1940 | Boyce | 167—42 X |
| 2,281,785 | 5/1942 | Mohr | 167—42 X |
| 2,760,900 | 8/1956 | Glenn et al. | 167—32 X |
| 2,980,582 | 4/1961 | Keats | 167—39 |
| 3,009,855 | 11/1961 | Lambrech | 167—32 |
| 3,159,536 | 12/1964 | Marotta | 167—42 |

OTHER REFERENCES

Frear: Chemistry of the Pesticides, 3rd ed., D. Van Nostrand Co., New York (1955), pp. 21, 25, 26, 30, 33 and 87.

Metcalf: Organic Insecticides, Interscience Publishers, Inc., New York (1955), pp. 193 and 200.

Shepard: The Chemistry and Action of Insecticides, McGraw-Hill Book Co., New York (1951), pp. 345–346.

The Yearbook of Agriculture, "Insects," U.S. Dept. of Agriculture, Washington, D.C. (1952), pp. 258–269 and 470–472.

ALBERT T. MEYERS, *Primary Examiner*.

JULIAN S. LEVITT, *Examiner*.

VERA C. CLARKE, *Assistant Examiner*.